(12) United States Patent
Chu et al.

(10) Patent No.: US 7,774,386 B2
(45) Date of Patent: Aug. 10, 2010

(54) APPLYING ABSTRACTION TO OBJECT MARKUP DEFINITIONS

(75) Inventors: Heng Chu, Chapel Hill, NC (US); Erich S. Magee, Morrisville, NC (US); Robert C. Sizemore, Fuguay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 1648 days.

(21) Appl. No.: 10/626,340

(22) Filed: Jul. 24, 2003

(65) Prior Publication Data

US 2005/0039124 A1    Feb. 17, 2005

(51) Int. Cl.
*G06F 7/00* (2006.01)
*G06F 17/30* (2006.01)
(52) U.S. Cl. ...................... 707/809; 715/237
(58) Field of Classification Search .................. 707/101
See application file for complete search history.

(56) References Cited

U.S. PATENT DOCUMENTS

| | | | |
|---|---|---|---|
| 6,418,446 B1 | 7/2002 | Lection et al. | |
| 6,446,256 B1 | 9/2002 | Hyman et al. | |
| 6,591,260 B1* | 7/2003 | Schwarzhoff et al. | 707/2 |
| 6,996,589 B1* | 2/2006 | Jayaram et al. | 707/204 |
| 7,065,742 B1* | 6/2006 | Bogdan | 717/106 |
| 7,458,082 B1* | 11/2008 | Slaughter et al. | 719/328 |
| 2003/0014442 A1 | 1/2003 | Shiigi et al. | |
| 2003/0023623 A1 | 1/2003 | Horvitz et al. | |
| 2003/0037301 A1 | 2/2003 | Rising, III | |
| 2003/0208498 A1* | 11/2003 | Feinberg et al. | 707/100 |
| 2004/0002952 A1* | 1/2004 | Lee et al. | 707/1 |
| 2004/0083219 A1* | 4/2004 | Hu et al. | 707/100 |
| 2004/0083221 A1* | 4/2004 | Dapp et al. | 707/100 |
| 2004/0133595 A1* | 7/2004 | Black | 707/103 Y |
| 2004/0153967 A1* | 8/2004 | Bender et al. | 715/513 |
| 2004/0168115 A1* | 8/2004 | Bauernschmidt et al. | 715/500 |
| 2004/0210828 A1* | 10/2004 | Langer | 715/501.1 |
| 2005/0149847 A1* | 7/2005 | Chandler | 715/500 |

OTHER PUBLICATIONS

W3C "XQuery 1.0 and XPath 2.0 Functions and Operations." W3C: May 2002. pp. 1-177. http://www.w3.orgrTR/2003/WD-xpath-functions-20030502/.*
Machal, Benoit, "Tip: Tell a parser where to find a schema ", May 22, 2003 DeveloperWorks, Jul. 2, 2003 <http://www-106.ibm.com/developerworks/xml/library/x-tipvalschm>. (p. 1-7 of 7).
McLaughlin, Brett "Tip: Validation and the SAX ErrorHandler interface", Jun. 1, 2001, DeveloperWorks, Jul. 11, 2003, <http://www-106.ibm.com/developerworks/library/x-tipeh.html> (p. 1-4 of 4).
Roy, Jaideep, et al. "XML Schema Language: Taking XML to the Next Level", IT Professional, vol. 3 Issue, Mar./Apr. 2001 (p. 37-40).

* cited by examiner

*Primary Examiner*—John R. Cottingham
*Assistant Examiner*—Kimberly Lovel
(74) *Attorney, Agent, or Firm*—Marcia L. Doubet

(57) ABSTRACT

Techniques for enabling a validating parser to interpret a schema, where that schema may have been extended to multiple levels, and to perform the validation of a structured document according to the extended schema while still allowing a consumer application to request objects or events that are cast at some different level of the schema (including the base schema). Validating the source document according to an extended (i.e., more specific) schema enables improved detection of syntax errors. At the same time, casting objects and events from the parsed document to a level requested by the consumer application allows the consumer to receive only those objects or events for which it is adapted, without requiring the consumer application to include extra code to deal with objects or events it does not recognize in the parser's output. Preferably, the parser simply discards those objects or events which this consumer is not interested in receiving.

18 Claims, 12 Drawing Sheets

```
<?xml version="1.0" ?>

<xsd:schema xmlns:xsd="http://www.w3.org/2001/XMLSchema">

<!-- ************************************************** -->
<!-- The root element defines a person.                  -->
<!-- ************************************************** -->

<xsd:element name="person" type="personType"/>          — 110

<xsd:complexType name="personType" mixed="false">
        <xsd:all>
            <xsd:element name="name" type="xsd:string" minOccurs="1" maxOccurs="1" />      — 130
            <xsd:element name="address" type="xsd:string" minOccurs="1" maxOccurs="1" />   — 140
        </xsd:all>
        <xsd:attribute name="height" type="xsd:integer" use="optional" />                  — 150
        <xsd:attribute name="weight" type="xsd:integer" use="optional" />                  — 160
    </xsd:complexType>
</xsd:schema>
```
120 (braces around complexType block)

```
<?xml version="1.0" encoding="UTF-8"?>
<person
    xmlns:xsi="http://www.w3.org/2001/XMLSchema-instance"
    xsi:schemaLocation="http://www.myCompany.com/base.xsd"   — 220
    height=72 weight=190>
    <name>John</name>
    <address>123 Main Street</address>
</person>
```
210 (brace around person block)

FIG. 3A
(Prior Art)

```xml
<?xml version="1.0"?>
<xsd:schema xmlns:xsd="http://www.w3.org/2001/XMLSchema">

<!-- ******************************************************* -->
<!-- This extension adds gender to a person. -->
<!-- ******************************************************* -->

<xsd:redefine schemaLocation="base.xsd">
  <xsd:complexType name="personType">
    <xsd:complexContent>
      <xsd:extension base="personType">
        <xsd:attribute name="gender" type="xsd:string" use="optional" />
      </xsd:extension>
    </xsd:complexContent>
  </xsd:complexType>
</xsd:redefine>
</xsd:schema>
```

```
330
<?xml version="1.0" ?>

<xsd:schema xmlns:xsd="http://www.w3.org/2001/XMLSchema">

<!-- ************************************************** -->
<!-- This extension adds age to a person.                -->
<!-- ************************************************** -->

340  <xsd:redefine schemaLocation="base.xsd">
     <xsd:complexType name="personType">          351
       <xsd:complexContent>
         <xsd:extension base="personType">        352
           <xsd:attribute name="age" type="xsd:integer" use="optional" />   353
         </xsd:extension>
       </xsd:complexContent>
     </xsd:complexType>
     </xsd:redefine>
350
</xsd:schema>
```

FIG. 3C
(Prior Art)

```
360
<?xml version="1.0" ?>
<xsd:schema xmlns:xsd="http://www.w3.org/2001/XMLSchema">
<!-- ****************************************************** -->
<!-- ** This extension adds marital status to a person.   -->
<!-- ****************************************************** -->
370  <xsd:redefine schemaLocation="base.xsd">
     <xsd:complexType name="personType">  381
       <xsd:complexContent>
         <xsd:extension base="personType">  382
           <xsd:attribute name="maritalStatus" type="xsd:string" use="optional" />  383
         </xsd:extension>
       </xsd:complexContent>
     </xsd:complexType>
380  </xsd:redefine>
</xsd:schema>
```

```xml
<?xml version="1.0" encoding="UTF-8"?>
<person
  xmlns:xsi="http://www.w3.org/2001/XMLSchema-instance"
  xsi:schemaLocation="//www.myCompany.com/ext1.xsd"
  height="72" weight="190" gender="M">
    <name>John</name>
    <address>123 Main Street</address>
</person>
```
*410*

```xml
<?xml version="1.0" encoding="UTF-8"?>
<person
  xmlns:xsi="http://www.w3.org/2001/XMLSchema-instance"
  xsi:schemaLocation="//www.myCompany.com/ext2.xsd"
  height="72" weight="190" age="35">
    <name>John</name>
    <address>123 Main Street</address>
</person>
```
*440*

```xml
<?xml version="1.0" encoding="UTF-8"?>
<person
  xmlns:xsi="http://www.w3.org/2001/XMLSchema-instance"
  xsi:schemaLocation="//www.myCompany.com/ext3.xsd"
  height="72" weight="190" maritalStatus="Single">
    <name>John</name>
    <address>123 Main Street</address>
</person>
```
*470*

```xml
<?xml version="1.0" ?>

<xsd:schema xmlns:xsd="http://www.w3.org/2001/XMLSchema">

<!-- ************************************************************ -->
<!-- The root element defines a person. -->
<!-- ************************************************************ -->

<xsd:element name="person" type="personType"/>

<xsd:complexType name="personType" mixed="false">
  <xsd:all>
    <xsd:element name="name" type="xsd:string" minOccurs="1" maxOccurs="1" />
    <xsd:element name="address" type="xsd:string" minOccurs="1" maxOccurs="1" />
  </xsd:all>
  <xsd:attribute name="height" type="xsd:integer" use="optional" />
  <xsd:attribute name="weight" type="xsd:integer" use="optional" />
  <xsd:attribute name="gender" type="xsd:string" use="optional" />
  <xsd:attribute name="age" type="xsd:integer" use="optional" />
  <xsd:attribute name="maritalStatus" type="xsd:string" use="optional" />
</xsd:complexType>
</xsd:schema>
```

```
<?xml version="1.0" encoding="UTF-8"?>
<person
    xmlns:xsi="http://www.w3.org/2001/XMLSchema-instance"
    xsi:schemaLocation="//www.myCompany.com/ext3.xsd"
    height="72" weight="190" gender="M" age="35"
    maritalStatus="Single">
    <name>John</name>
    <address>123 Main Street</address>
</person>
```

1110 ⎧ SAXParser parser = new SAXParser();                           1111
     ⎨ parser.setContentHandler(newContentHandler());
     ⎩ parser.setErrorHandler(errorHandler);

try
     {
1120   parser.setFeature("http://apache.org/xml/features/validation/");
1130   parser.setFeature("http://www.myCompany.com/xml/features/abstraction", "xmlns:base");
     }                                                               1131    1132
     catch (Exception e)
     {
       // if feature isn't recognized, print a message
       System.out.println("The Feature is unknown");
     }

1140  parser.parse(...);
```

APPLYING ABSTRACTION TO OBJECT MARKUP DEFINITIONS

BACKGROUND OF THE INVENTION

1. Field of the Invention

The present invention relates to computer software, and deals more particularly with techniques for applying dynamically-variable abstraction levels when parsing and validating structured documents according to a schema (which may have been extended).

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

Use of structured documents encoded in a structured markup language has become increasingly prevalent in recent years as a means for exchanging information between computers in distributed computing networks. In addition, many of today's software products are written to produce and consume information which is represented using these types of structured documents. The Extensible Markup Language, or "XML", for example, is a markup language which has proven to be extremely popular for encoding structured documents for exchange between parties (and also for describing structured data). XML is very well suited for encoding objects and document content covering a broad spectrum, and has become the standard means of providing a technology-independent representation. XML has also been used as a foundation for many other derivative markup languages, such as the Wireless Markup Language ("WML"), VoiceXML, MathML, and so forth (as is well known in the art). Encoding objects and other document content in XML (or a similar markup language) facilitates exchanging information between disparate systems. (Hereinafter, references to objects represented with markup language encoding in structured documents should also be construed as including document content that may be rendered in object form.)

For the early uses of structured documents, and in particular for XML version 1.0, a Document Type Definition ("DTD") was used for specifying the grammar for a particular structured document (or set of documents). That is, a DTD was used to specify the set of allowable markup tags, where this set indicates the permissible elements and attributes to be used in the document(s). In more recent years, a "schema" is commonly used instead of a DTD. A schema contains information similar to that in a DTD, but is much more functionally rich, and attempts to specify more requirements for the structured documents which adhere or conform to it. As stated by the World Wide Web Consortium ("W3C") on its "XML Schema" Web page, "XML Schemas express shared vocabularies and allow machines to carry out rules made by people. They provide a means for defining the structure, content and semantics of XML documents.". Use of schemas for structured languages is well known in the art.

A schema may be defined within a single file or document, or it may be defined using a collection of documents that are linked together using syntactical elements of the schema notation. The definition within a schema may be extended using a separate document, for example, to provide consumer-specific refinements. The original schema then serves as a base, and the extensions are applied as refinements to that base. In this approach, the base definition is known to each consumer, but each extension is typically known only by its specific consumer. Examples of using schema extensions in this manner will now be described with reference to several examples. (More details on schema extensions may be found at the W3C web site or in a number of readily-available documents that describe the schema notation.) FIG. 1 depicts a base schema 100, which specifies that a valid "person" element in a structured document contains child elements (i.e., nested elements) for the person's name and address and may optionally contain attributes for the person's height and weight. That is, the schema 100 defines a "person" element as being of type "personType" (see 110), and personType is then defined at 120 as being a complex type. The elements of this complex type are a "name" element 130 and an "address" element 140, both of which are specified as required (by setting minOccurs and maxOccurs both to "1", in this example). The optional "height" and "weight" attributes are defined at 150 and 160, respectively.

The sample markup document 200 in FIG. 2 defines a valid person element 210 that conforms conform to this base schema 100. The syntax at 220 of this sample document identifies the schema to which the document conforms. That is, according to the W3C documents defining the schema notation, the value of the "schemaLocation" attribute shown at 220 is used to "provide hints" as to where the schema can be found. In this example, the schema is identified using a Uniform Resource Identifier ("URI") with "base.xsd" as the resource name, and might therefore refer to the sample schema 100 in FIG. 1. The manner in which the base schema 100 of FIG. 1 may be extended to support alternative syntax and structures in conforming structured documents will now be described.

A first schema extension 300 is defined in FIG. 3A. A "redefine" element, as shown at 310, is used to specify that this is a schema extension. In a redefine element, the base schema to which the extensions apply is named as the value of the "schemaLocation" attribute. Thus, the redefinition specified in document 300 applies to a base schema in a document stored at "base.xsd", in this example. See reference number 311 in FIG. 3A. The body 320 of the schema extension 300 specifies that what is being redefined is the complex type named "personType". See reference number 321. Furthermore, the syntax at 322 specifies that this complex type is being used as a base type that is being extended, and the syntax at 323 indicates that the extension of person type comprises adding a "gender" attribute.

A second schema extension 330 is defined in FIG. 3B. Again, a redefine element is used, as shown at 340, and specifies that this extension redefines the base schema in the document stored at "base.xsd". In this sample extension 330, the body 350 of the schema extension again specifies that the complex type named "personType" is being redefined (see reference number 351) and that this complex type is being used as a base type that is being extended (see reference number 352). This time, however, the base "personType" is being extended to include an "age" attribute. See reference number 353.

FIG. 3C provides a third schema extension document 360. The redefine element at 370 again refers to the base schema in the document stored at "base.xsd", and the body 380 again specifies that the complex type named "personType" is being redefined (see reference number 381) and that this complex type is being used as a base type that is being extended (see reference number 382). In this extension, the base type is being extended to include a "maritalStatus" attribute. See reference number 383.

FIGS. 4A-4C provide sample XML documents that conform to the schema extensions specified in FIGS. 3A-3C, respectively. As can be seen by review of these sample documents 400, 430, 460, each document includes the additional attributes defined in the respective schema extension.

As has been demonstrated with the examples of FIGS. 3A-3C, the markup language notation for extending a schema is simple and intuitive. Schema extensions defined in this manner are readily supported by XML parsers of the prior art. However, in the prior art, the object-oriented notion of abstract classes and type casting (also referred to as "object casting") is beyond the scope of the markup languages and the parsers that process them. As a result, the application that consumes a parsed XML document (referred to hereinafter as a consumer or consumer application) is restricted to a specific extension of an extended schema. That is, a prior art parser will only render objects according to a specific schema extension. Typically, this is an (extended) schema that is referenced within the document to be parsed. Referring again to FIG. 4A, for example, the schema location element at 410 specifies that the resource name for the schema is "ext1.xsd". This is intended, in the examples used herein, to refer to the extended schema 300 in FIG. 3A. Similarly, in FIGS. 4B and 4C, elements 440 and 470 specify resource names of "ext2.xsd" and "ext3.xsd" for the schema location attribute, and these resource names are intended to refer to the extended schemas 330 and 360 of FIGS. 3B and 3C, respectively.

Selectively specifying which schema should be used as input to the parser is illustrated in FIG. 5. As shown therein, a base schema 500 is extended by three separate schema extensions 510, 511, 512. This scenario corresponds to the examples which have been described, wherein base schema 500 is exemplified by schema document 100 of FIG. 1 and wherein the schema extensions 510, 511, 512 are exemplified by schema extension documents 300, 330, 360 of FIGS. 3A-3C. (As will be obvious, a base schema and its extensions may be much more complicated than the simple examples provided herein for purposes of illustration.) A particular consumer application, a collection of which are represented in FIG. 5 by Consumer 1, Consumer 2, and Consumer 3 at reference number 540, requests that parser 520 parse a particular input document. The parser may use the specific schema identified by the schema location attribute of that input document. Alternatively, the consumer application may instruct the parser 520 as to which schema extension should be used. In either case, the parser generates its output to the consumer application in a form that adheres to the specified schema extension, as indicated generally at reference number 530. So, for example, if Consumer 1 requests parsing according to the schema extension in extension document 510 ("Ext 1", in the figure), then the input document being parsed must adhere to the syntax of that extension and the parser's output will use the syntax of that extension as well.

With reference to the sample schema extensions in FIGS. 3A-3C, for example, Consumer 1 might be adapted for processing person elements that include a gender attribute, Consumer 2 might be adapted for processing person elements that include an age attribute, and Consumer 3 might be adapted for processing person elements that include a marital status attribute. Because of the extensibility of XML documents and the wide distribution that is possible due to their transportability, it may frequently happen that a receiver of an XML document makes additions to, or changes in, the syntax of that document. For example, an application might receive a document containing person elements that include only the child elements and attributes that were defined in the base schema 100, and might then modify that document to include age attributes in conformance with schema extension 330.

Extensions of this type present problems during the parsing process. XML documents that conform to an extended schema cannot be validated and processed by tools designed for the base (i.e., non-extended) type. Therefore, a validating parser that uses the base schema 100 when parsing one of the extended-schema documents 300, 330, 360 will regard the additional gender, age, and marital status attributes as invalid syntax. An exception will be generated, and the consumer application will not receive the value of the corresponding attribute.

In addition, it may happen that the proper schema is identified for validating the extended syntax of the XML document, but that the consumer application is not adapted for dealing with the extensions. Suppose, for example, that the XML document 400 in FIG. 4A is received as input to an application that only knows about the base schema 100 in FIG. 1. Assuming that the parser 520 in FIG. 5 uses the extended schema identified at 410 in FIG. 4A in the parsing process, the parser will deliver objects or events that may include the gender attribute defined in this schema extension. This may cause problems for the consumer application, which may need to include special code to deal with such "unexpected" input.

Furthermore, schema extensions may be cumulative (i.e., nested), which exacerbates this problem for prior art parsers. Suppose, for example, that the schema extension 330 in FIG. 3B referred to the location of the schema extension 300 in FIG. 3A as its base (e.g., by specifying an attribute such as " . . . schemaLocation=" . . . /ext1.xsd" at 340), and the schema extension 360 in FIG. 3C referred to the schema extension 330 as its base (e.g., by specifying " . . . schemaLocation=" . . . /ext2.xsd" at 370). In that case, a valid XML document could contain person elements having gender, age, and marital status attributes (in addition to the height and weight attributes from the base schema definition 100). FIG. 6 illustrates, in a composite form, a schema 600 that corresponds to the result of applying these nested extensions. (Note that this schema document 600 is provided only for illustrative purposes. The schema extensions still remain in distinct documents, as in FIGS. 3A-3C.) A document conforming to this nested extended schema is illustrated at 700 in FIG. 7. Pictorially, the nested extensions and their cumulative or composite effect are illustrated in FIG. 8 (see, generally, reference number 800).

In this situation, the validation of document 700 must use the most-specific schema extension, in order to avoid generating exceptions for those attributes that have been added to the base schema. In many cases, the consumer application may not want all of these attribute values, and in fact, receiving the values from the parser may cause problems in the consumer application if it is not adapted for dealing with those attributes (as was noted earlier). Suppose that some consumer application needs (or can process, when present) the gender and age attributes, but does not know about (and therefore cannot use) the marital status attribute. If the objects delivered to this consumer application from the parser were created according to the most-specific schema extension, the parser will not generate syntax errors or exceptions when parsing document 700, but the consumer application will receive an attribute value (i.e., marital status) that it does not recognize. This "extra" attribute may cause the application to fail. Or, programmers may have to write additional error checking logic to deal with such unexpected input values. If, on the other hand, the parsing is performed according to the next-most-specific schema extension (i.e., including the gender and age attributes), then the parser will generate a syntax error during the validation process when it encounters a person element with a "maritalStatus" attribute. This may prevent the consumer application from receiving any of the data for the element that has been flagged by the parser as having invalid syntax, which is obviously an undesirable result.

In the prior art, validation is often turned off in the parser to avoid problems of the types described above. Therefore, the unrecognized syntax in the parsed document is simply ignored. However, this "workaround" then hides true errors in the syntax of input documents. This is also undesirable.

Accordingly, what is needed are improvements to the processing of documents created according to extended schemas.

SUMMARY OF THE INVENTION

An object of the present invention is to provide techniques for improving the processing of documents created according to extended schemas.

Another object of the present invention is to provide techniques for applying dynamically-variable abstraction levels when parsing and validating structured documents according to a schema.

A further object of the present invention is to provide techniques for enabling a consumer application to specify which abstraction level should be used when creating objects or generating events for that consumer application.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, the present invention comprises techniques for selecting an abstraction level to use when generating parser output by requesting generation of parser output, by a parser that parses an input, such that the generated output adheres to a different syntax level than a syntax level used when validating the input. The validation is preferably performed by the parser as well (and the parser may therefore be an enhanced validating parser). The input is preferably a structured document, such as an XML document. The generated output may comprises one or more object representations generated from the input.

In another aspect, the present invention comprises techniques for casting objects, such that an input is validated according to a first syntax level while output is generated, from the input, according to a second syntax level. The second syntax level is preferably a less-restrictive version of the first syntax level, and the first syntax level is preferably an extension of the second syntax level (or an extension of some other extension of the second syntax level). Preferably, the first syntax level and the second syntax level are defined using schemas, and the schema that defines the first syntax level is an extension of the schema that defines the second syntax level (or of some other schema that extends the schema that defines the second syntax level). The input then adheres to an extended schema that defines the first syntax level, and the second syntax level to which the generated output adheres may be, for example, a base schema that is extended by the extended schema that defines the first syntax level.

In yet another aspect, the present invention comprises techniques for applying abstraction to object markup definitions, such that a validating parser is used to validate an input document expressed as an object markup definition while the validating parser is also used to apply abstraction to the object markup definition when generating an output object, responsive to the validating. In this aspect, the validation is preferably performed according to a syntax level which allows the object markup definition to be successfully validated, while the application of abstraction preferably generates the output object according to a different syntax level which would not allow the object markup definition to be successfully validated. This different syntax level is preferably requested by an application program that will consume the generated output object.

In still another aspect, the present invention comprises techniques for improved parsing of input, such that an input is validated according to a first schema, wherein the first schema defines a first level that enables content in the input to be successfully validated, and one or more output objects are generated according to a second schema, upon parsing the successfully-validated content in the input, wherein the second schema defines a second syntax level that does not enable the content in the input to be successfully validated. Preferably, the first syntax level is a more-restrictive version of the second syntax level. The first schema is preferably defined as an extension of the second schema, or, as in the other aspects, as an extension of some intermediate schema that extends the second schema.

The present invention may also be used advantageously in methods of doing business, for example by providing improved validation and parsing for clients. This may comprise: providing a validating parser that enables a client to dynamically select an abstraction level for use when generating output from the validating parser; obtaining an input document to be validated and parsed for the client; validating the input document with the provided validating parser, wherein the validation is performed according to a first syntax level associated with syntax specified in the input document; generating output from the input document with the provided validating parser, wherein the generated output has syntax that conforms to the abstraction level that has been dynamically selected by the client and wherein the abstraction level is a refinement of the first syntax level; and charging the client a fee. The fee may be for the providing, obtaining, validating, and/or generating. The fee for this improved validation and parsing may be collected under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIG. 1 illustrates a sample schema definition, according to the prior art;

FIG. 2 is a markup language document that conforms to the schema definition in FIG. 1;

FIGS. 3A-3C illustrate sample schema extensions that extend the schema in FIG. 1, according to the prior art;

FIGS. 4A-4C provide sample markup language documents conforming to the extended schema definitions in FIGS. 3A-3C, respectively;

FIG. 6 shows how the schema extensions in FIGS. 3A-3C would logically form a composite schema definition if applied in a cumulative manner, rather than in the alternative approach used in FIGS. 3A-3C;

FIG. 7 provides a sample document that adheres to the schema represented by FIG. 6;

FIG. 11 illustrates how a parser may be notified to render (i.e., provide to a requesting consumer application) objects according to a particular schema extension level.

DESCRIPTION OF PREFERRED EMBODIMENTS

Figure 5:
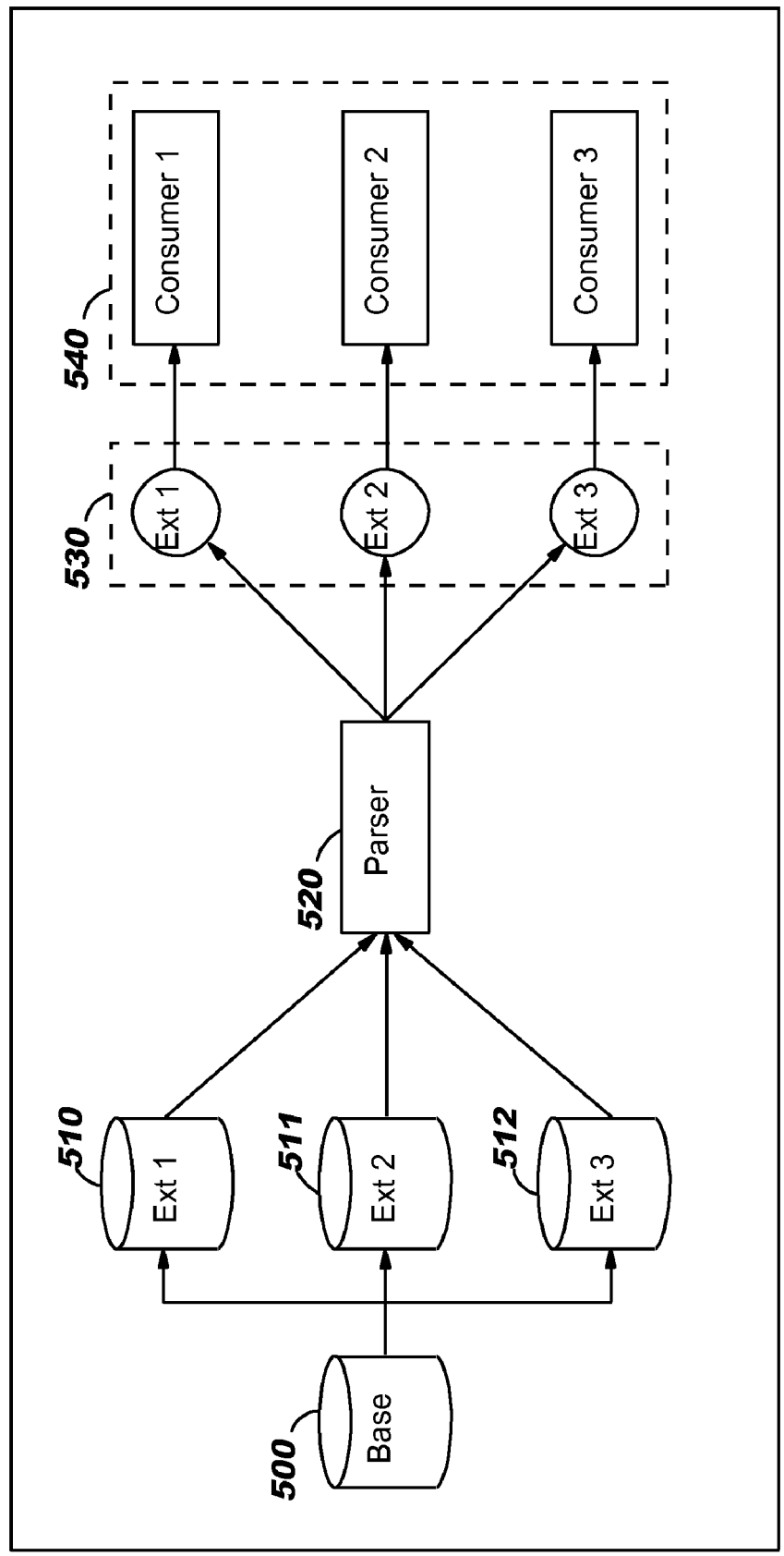
FIG. 5 is used to describe how a parser of the prior art provides data to consumer applications when using schema extensions.

The present invention provides techniques for improving the processing of documents created according to extended schemas, by applying selectable, dynamically-variable abstraction levels when validating and parsing structured documents. A consumer application using the present invention can specify which abstraction level should be used when creating objects for that consumer application. A validating parser can then interpret a schema, which may be extended to multiple levels, at the level needed by the consumer while still maintaining the accuracy of all the extensions.

Consider a common object description maintained as a markup language representation. This common object may be extended by different organizations in ways that are application-specific. If this common object is to be shared among the organizations, each consumer application must be able to process the object instances using a schema that represents only the extensions known to that consumer application. Any extensions that are not understood by a consumer application should not be delivered from the parser to that application. Thus, with reference to the examples that have been presented, a person object created according to the base schema in FIG. 1 may be extended by one organization to include gender, age, and marital status attributes. If this person object is passed to another organization (or simply to a different consumer application), where that particular combination of schema extensions is not in use, techniques disclosed herein enable the receiving consumer application to request that only a subset of the values from the parsed object instance are delivered from the parser, where that subset conforms to a different schema extension (or perhaps to the base schema). Thus, consumer applications can request a particular abstraction level, or "type casting", when using the present invention.

Use of the present invention enables, for example, a standard Hypertext Markup Language ("HTML") browser—which performs a parsing and validation of input documents according to a standard (i.e., non-extended) HTML schema—to validate and process an HTML page with Microsoft-specific extensions. Or, a standard "J2EE"™ (Java 2 Platform, Extended Edition) application server might want to validate and process an Enterprise JavaBeans™ ("EJB"™) descriptor containing WebSphere® extensions. A WebSphere application server might choose to deploy Enterprise Archive ("EAR") files produced with BEA extensions in a standard fashion, such that the BEA extensions are validated but are not deployed with the EAR files. These scenarios are all made possible through use of the present invention. In other words, the extensions can be selectively ignored, so that objects adhering to the standard or base schema definition are produced for the consumer application even though an extended schema may be used in the parser's validation of the source document. ("J2EE", "Enterprise JavaBeans", and EJB" are trademarks of Sun Microsystems, Inc. "WebSphere" is a registered trademark of International Business Machines in the United States, other countries, or both.)

According to preferred embodiments, a consumer application specifies its desired extension level (referred to equivalently herein as a desired abstraction level). An event-based parser (such as a SAX, or "Simple API for XML", parser) then generates events only at the selected abstraction level. Or, when a DOM ("Document Object Model") parser is used, the DOM tree created by the parser contains nodes or objects only for the selected abstraction level. Embodiments of the present invention thereby perform type casting of objects on a selectable, dynamically-variable level. In addition to generating events or building DOM objects at the selected level, however, embodiments of the present invention also perform a full validation of the source document, using an extension level that may be more restrictive than the level used for casting the objects. This approach ensures that the markup syntax of the source document (i.e., the document being parsed) is valid, even though some of that syntax may not be of interest to the consumer application. As stated earlier, variations in schema extensions are typically handled in the prior art by turning off the validating aspect of parsers, and/or by writing customized application-specific code to deal with variations in syntax (i.e., unexpected elements and/or attributes). Use of the present invention avoids these undesirable prior art approaches, and provides a common way to validate XML documents without customized code while providing a consumer application with events or objects at the extension level that has been specifically selected.

Figure 9:
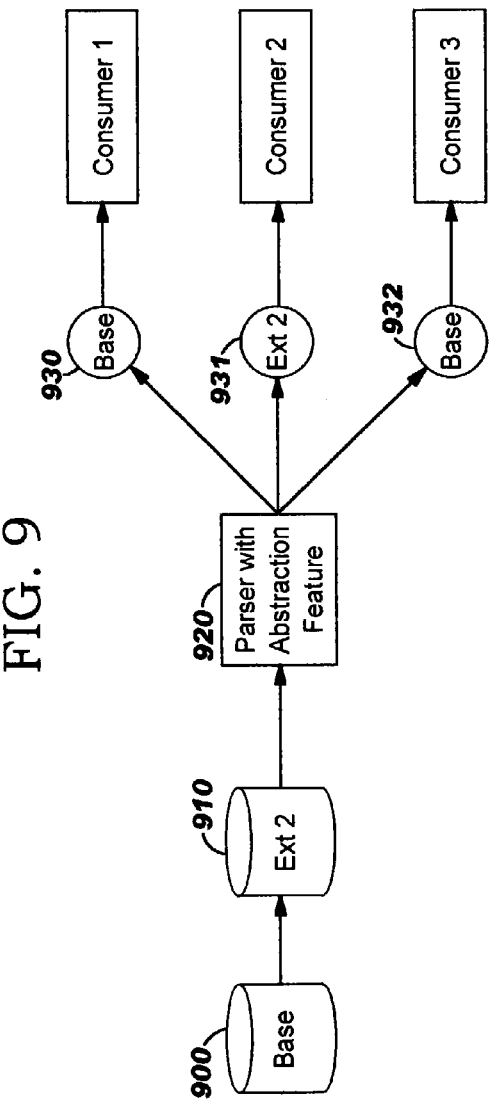
FIGS. 9 and 10 illustrate how embodiments of the present invention enable selectively casting objects at one abstraction level while validation may be performed at a different abstraction level, when using extended schemas.

The result of this selective specification of abstraction levels is illustrated at a high level in FIG. 9. As shown therein, a single schema extension, "Ext 2" 910, is applied to a base schema 900. These definitions are provided to a parser 920 that uses techniques of the present invention, referred to at 920 for illustrative purposes as "Parser with Abstraction Feature". If a structured document conforming to the schema 900 as extended by schema extension 910 is provided to parser 920, the parser will validate the full syntax according to the extended schema, but consumer applications may choose whether they wish to receive events and objects according to that extension or according to only the base schema. Thus, in the example in FIG. 9, Consumer 1 and Consumer 3 have chosen to receive only those events/objects defined according to the base schema 900 (as indicated by reference numbers 930 and 932), while Consumer 2 has chosen to receive objects defined according to the extended schema 910 (as indicated by reference number 931). (Hereinafter, the output of the parser is referred to as an object, although this should be construed as including events in an event-based parser.)

Using the previously-described examples, suppose the source document being parsed and validated is document 430 of FIG. 4B, the base schema 900 is schema 100 in FIG. 1, and the schema extension 910 is schema extension 330 of FIG. 3B. In other words, the extended schema defines a person element that includes an age attribute. Upon validating and parsing document 430, Consumer 1 and Consumer 3 will receive objects that do not include the age attribute, whereas the objects provided by parser 920 to Consumer 2 will include the age attribute (when present in the source document, given that in the example schema extension 330, the age attribute was specified as optional).

Figure 8:
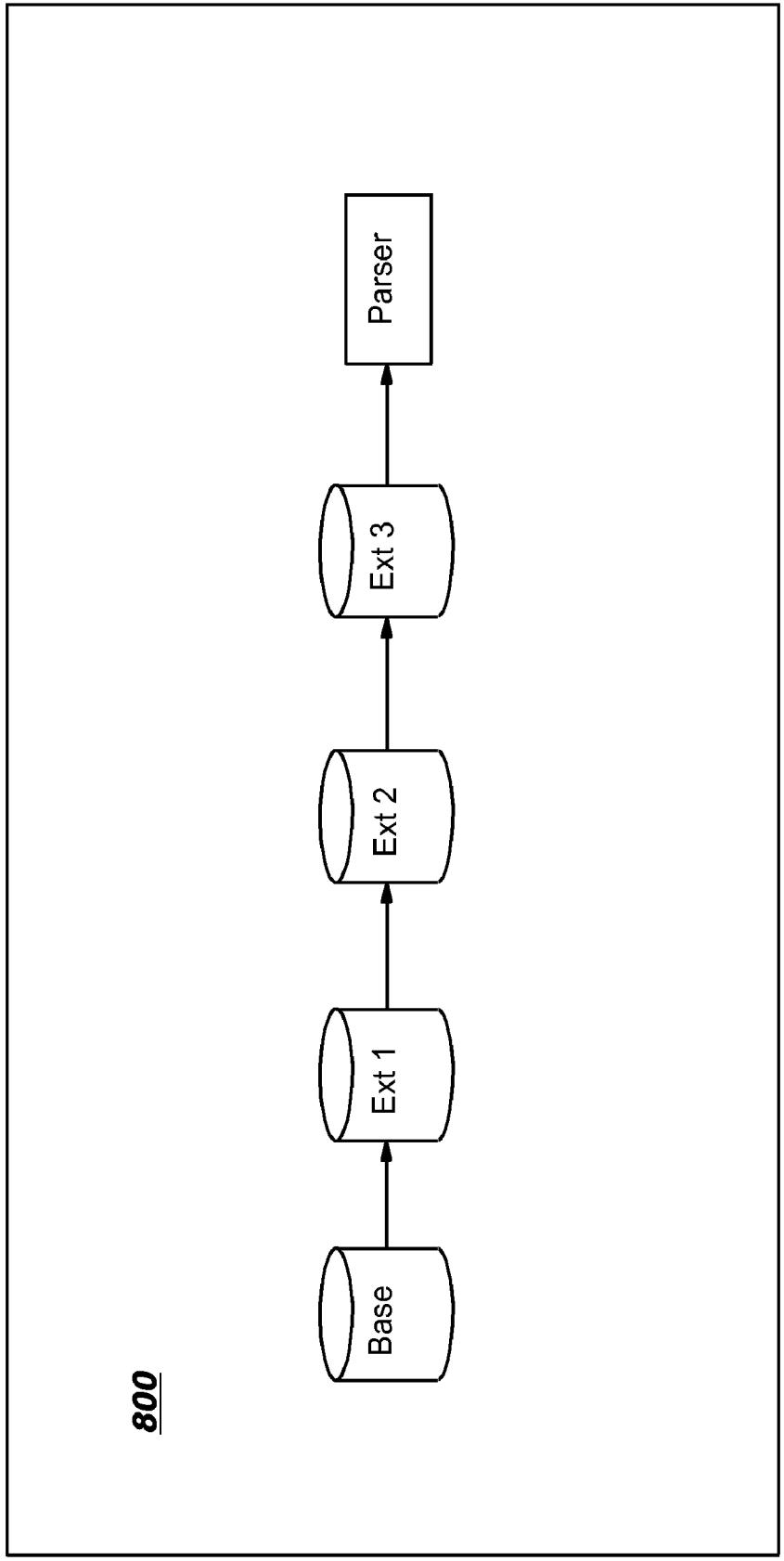
FIG. 8 is used to describe the cumulative application of schema extensions in a parsing operation of the prior art.
Figure 10:
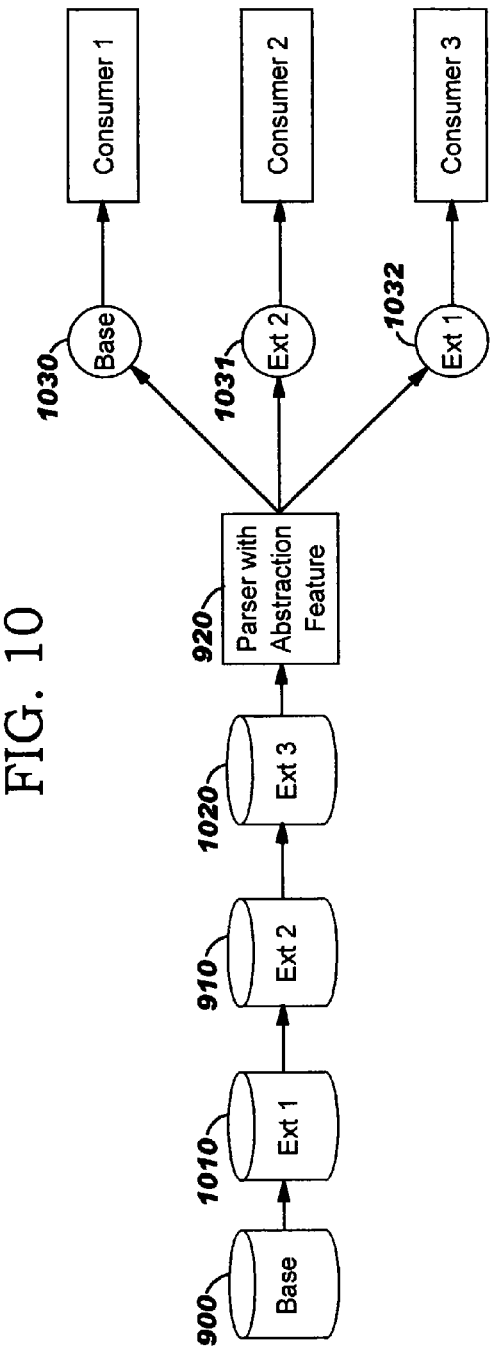

FIG. 10 provides another example of this selective specification of abstraction levels. Here, the schema extensions have been defined as cumulative (as was described with reference to FIG. 8). In the example of FIG. 10, schema extension 1010 extends base schema 900; schema extension 910 then further extends the result; and schema extension 1020 then further extends that result. So, for example, a person element might be defined to include a gender attribute by schema extension 1010, an age attribute by schema extension 910, and to also include a marital status attribute by schema extension 1020. Accordingly, the parser can validate the full syntax of a source document such as document 700 of FIG. 7. Consumer 1 in the example of FIG. 10 requests to receive objects according to the base schema (where the only attributes for a person element are height and weight attributes; see reference number 1030), while Consumer 2 requests to receive objects according to the second level of extensions (i.e., person elements having gender and age attributes, in addition to height and weight attributes; see reference number 1031), and Consumer 3 requests to receive objects only according to the first level of extensions (i.e., person elements having height, weight, and gender attributes; see reference number 1032).

As will be obvious, in actual practice, this selective specification of abstraction levels may involve much more complex variations among what is provided to consumer applications than what has been illustrated by the simple examples provided herein where only a single attribute is affected by each schema extension.

FIG. 11 illustrates how preferred embodiments notify a parser to render (i.e., provide to a requesting consumer application) objects created according to a particular schema extension level. See reference number 1100. Prior art parsers are typically implemented with an interface that allows invocation of a "setFeature" method, whereby parser features or options may be selected by an application that instantiates a parser instance. Two invocations of this well-known setFeature method are shown in FIG. 11, at 1120 and 1130. The first invocation 1120 is known in the prior art, and specifies a validation feature that engages schema validation in the parser. A URI is specified as a parameter to the setFeature method, providing a fully-qualified reference to the validation feature. (The syntax shown at 1110 instantiates a new parser, then registers a content handler to handle parsed events and an error handler to handle validation errors, using prior art techniques which do not form part of the present invention.) The invocation at 1130 engages techniques defined by the present invention, as will now be described in more detail.

The setFeature method used by preferred embodiments is preferably implemented by subclassing the existing parse method to provide a feature-based approach. The existing parse method is therefore automatically overridden. This new setFeature invocation takes as parameters two string values (which are illustrated at 1131 and 1132). The first parameter of the is a fully-qualified URI that informs the parser method that abstraction is to be performed, and the second parameter is then a string that identifies the name space of the desired abstraction level (i.e., the name of the schema definition to use when casting objects from the parsed elements). Accordingly, this abstraction level is set as a feature of the parser instance, and the overridden superclass is invoked as usual. See 1140, where the parse method is invoked on this parser instance. (Parameters provided on the invocation have not been shown, but typically identify the input document and where to print any error messages.) The overriding parse method recognizes that the feature has been set, and retrieves the name that is specified for the desired abstraction level and passes that name to the superclass upon invocation. The superclass then uses that abstraction level.

Thus, in the example shown in FIG. 11, the application generating the parser instance has requested that objects conforming to the base schema (i.e., a schema stored in file "base.xsd", identified at 1132) is the desired abstraction level. Therefore, using the previously-described examples, any gender, age, and/or marital status attributes appearing in the source document will be validated for syntactical correctness (assuming the validation is performed according to a schema with these extensions), but will be suppressed from the objects passed to the consumer application.

Figure 12:
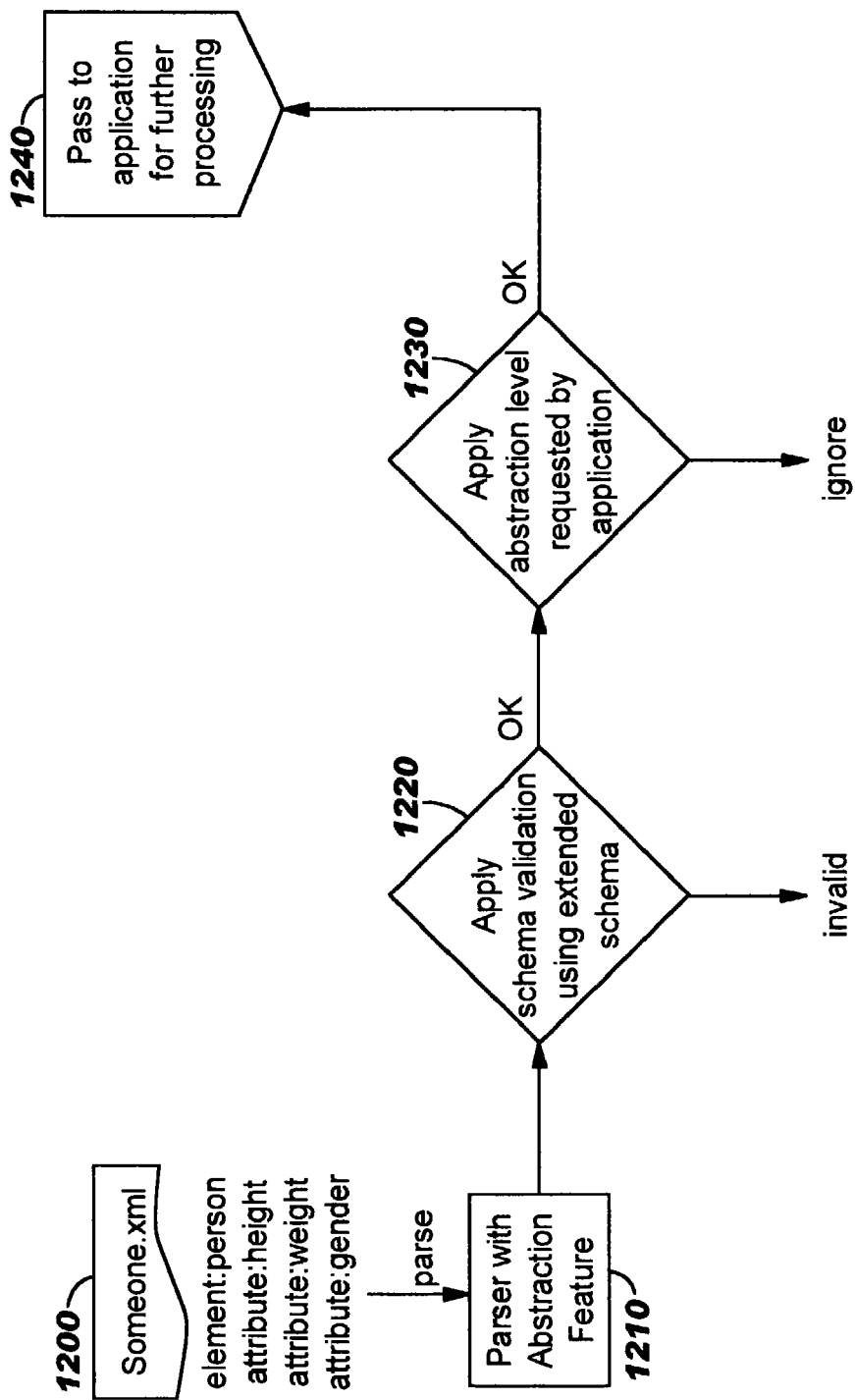
FIG. 12 provides a flowchart illustrating logic that may be used when implementing preferred embodiments of the present invention.

FIG. 12 provides a flowchart showing a logic flow of the abstraction feature disclosed herein. A source document 1200, referred to in the example as being stored with the file or resource name "someone.xml", is provided, and contains a person element with height, weight, and gender attributes. This source document is passed to a parser 1210 that includes an abstraction feature according to the present invention. The parser 1210 validates the source document 1200 using an extended schema, and if any validation errors are detected in an element being parsed, an exception is thrown, as indicated generally at 1220. If the element validates properly, according to the extended schema, then the parser 1210 applies the abstraction level requested by the consumer application. This may comprise ignoring some portion of the validated syntax, as shown generally at 1230. Only the syntax that conforms to the requested abstraction level is then present in the object(s) passed to the consumer application at 1240 for further processing by that application.

As has been demonstrated, the present invention provides significant advantages over prior art processing of structured documents that use extended schemas. The techniques disclosed herein are easy to use in requesting applications, and no change is required to the structured documents themselves.

As an alternative to use of a feature-based implementation in a parser, an application-specific content handler may be implemented. This content handler must catch every parser event and apply the desired abstraction level, thereby suppressing any undesired extensions. This content handler may be set into the parser in the "setContentHandler" invocation shown at 1111 of FIG. 11.

It should be noted that while the discussions herein are in terms of using XML documents, this is for purposes of illustration but not of limitation. The inventive concepts disclosed herein may be adapted to elements encoded in other structured markup languages without deviating from the scope of the present invention.

The disclosed techniques may also be used advantageously in methods of doing business, for example by providing services that perform improved validation and parsing for clients, using selective abstraction levels as has been described. This service may be provided under various revenue models, such as pay-per-use billing, monthly or other periodic billing, and so forth.

Commonly-assigned U.S. patent application Ser. No. 10/403,342, (filed Mar. 28, 2003; now abandoned), which is titled "Dynamic Data Migration for Structured Markup Language Schema Changes", defines techniques for dealing with schemas that are undergoing revision. Using techniques disclosed therein, the XML files that adhere to a changing schema can by revised programmatically, using knowledge of the particular schema changes that have been made. (This knowledge also enables determining whether any validation problems that arise are simply due to the schema changes, or instead signify an error in the document-producing logic.) However, this commonly-assigned invention does not disclose use of selectable abstraction levels as disclosed herein.

Commonly-assigned U.S. patent application Ser. No. 10/016,933 (filed Mar. 28, 2003; now abandoned), which is entitled "Generating Class Library to Represent Messages Described in a Structured Language Schema", discloses techniques whereby class libraries are programmatically generated from a schema. Templates are used for generating code of the class libraries. According to techniques disclosed therein, optional migration logic can be programmatically generated to handle compatibility issues between multiple versions of an XML schema from which class libraries are generated. Multiple versions of an XML schema are read and compared, and a report of their differences is prepared. The differences are preferably used to generate code that handles both the original schema and the changed version(s) of the schema. The class library is then preferably programmatically re-generated such that it includes code for the multiple schema versions. This allows run-time functioning of code prepared according to any of the schema versions. The techniques disclosed therein are not directed toward casting objects at selectable levels.

Commonly-assigned U.S. Pat. No. 6,418,446, titled "Method for Grouping of Dynamic Schema Data using XML", discloses techniques for accommodating variations in data formats that may be due to schema changes. Techniques disclosed therein enable all added data fields in a record to be made available for processing and removed data fields to be omitted, without requiring advance knowledge of the added and removed fields. This commonly-assigned patent does not teach the selective object casting techniques disclosed herein.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams usable in methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions, which may be stored on one or more computer-readable media, may be provided to a processor of a general purpose computer, special purpose computer, embedded processor, or other programmable data processing apparatus to produce a machine, such that the instructions, which execute via the processor of the computer or other programmable data processing apparatus, create computer-readable program code means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of casting objects, comprising:
providing a validating parser that is configured for validating whether syntax elements of an input document conform to a first schema definition identified in the input document while generating output objects, from the validated syntax elements of the input document, that conform to a second schema definition dynamically selected by a consuming application of the generated output objects;
using the validating parser for validating whether the syntax elements of the input document conform to the first schema definition, wherein:
the first schema definition is an extended schema;
using the validating parser, responsive to the validating of the syntax elements, for generating the output objects to conform to the second schema definition, wherein:
the second schema definition is a base schema from which the extended schema was extended, such that the extended schema defines at least one syntax element that is not defined in the base schema; and
the generating further comprises not generating any output object for any of the at least one syntax element that is defined in the extended schema but not defined in the base schema in order that the generated output objects will conform to the second schema definition; and
providing the generated output objects, by the validating parser, for use by the consuming application.

2. The method according to claim 1, wherein:
an intermediate schema definition extends the base schema by adding at least one syntax element not defined in the base schema; and
the first schema definition extends the intermediate schema definition by adding at least one syntax element not defined in the intermediate schema definition; and
the generating further comprises not generating any output object for any of the at least one syntax element that is defined in the intermediate schema but not in the base schema.

3. A computer-implemented method of providing validation and parsing, comprising:
providing a validating parser configured for validating an input document according to a first schema definition identified in the input document while generating output, from the validated input document, according to a second schema definition dynamically selected by a consuming application of the generated output;

validating syntax elements of the input document with the provided validating parser according to the first schema definition, wherein the first schema definition is an extended schema which specifies a syntax definition to which the syntax elements of the input document are to adhere; and responsive to the validating of the syntax elements, parsing the validated syntax elements to generate the output for the consuming application according to the second schema definition, wherein the second schema definition is a base schema from which the extended schema was extended, thereby suppressing at least one of the validated syntax elements when generating the output for the consuming application, wherein each of the suppressed syntax elements is valid according to the extended schema but is not valid according to the base schema.

4. The computer-implemented method according to claim 3, wherein:

an intermediate schema definition extends the base schema by adding at least one syntax element not defined in the base schema; and the first schema definition extends the intermediate schema definition by adding at least one syntax element not defined in the intermediate schema definition; and the suppressing also suppresses each syntax element that is valid according to the intermediate schema but which is not valid according to the base schema.

5. A computer-implemented method of applying abstraction by a validating parser, comprising:

using, by a validating parser, a first schema definition for validating syntax elements when parsing syntax of an input document, wherein the first schema definition is identified in the input document; and omitting, by the validating parser when generating output from the parsed syntax of the input document, each of at least one of the validated syntax elements which is valid according to the first schema definition but is not valid according to a second schema definition for which the output is generated, wherein:

the first schema definition is an extended schema;

the second schema definition is a base schema from which the extended schema is extended, such that the extended schema defines at least one syntax element that is not defined in the base schema; and the second schema definition is dynamically requested, to the validating parser, by an application program for which the output is being generated.

6. The method according to claim 5, wherein the input document is a structured document.

7. The method according to claim 6, wherein the structured document is encoded in Extensible Markup Language (XML).

8. The method according to claim 5, wherein the generated output comprises at least one object representation generated from the input document.

9. The method according to claim 5, wherein the second schema definition is requested by specifying a schema name of the second schema definition, to which the generated output must adhere.

10. The method according to claim 5, wherein the second schema definition is requested by specifying a schema name of the second schema definition, indicating that the second schema definition is to be used by the validating parser when generating the output.

11. The method according to claim 10, wherein the schema name is specified, by the application program, as a feature on an invocation of the validating parser.

12. The method according to claim 5, wherein the identification of the first schema definition in the input document comprises a specification, in the syntax of the input document, of the first schema definition.

13. The method according to claim 5, wherein the identification of the first schema definition in the input document uses a schema location construct in the input document.

14. The computer-implemented method according to claim 5, wherein:

an intermediate schema definition extends the base schema by adding at least one syntax element not defined in the base schema; and the first schema definition extends the intermediate schema definition by adding at least one syntax element not defined in the intermediate schema definition; and the omitting also omits each validated syntax element that is valid according to the intermediate schema but which is not valid according to the base schema.

15. A system for applying abstraction with a validating parser, comprising:

a computer comprising a processor;

a validating parser executing on the computer; and instructions which are executed, using the processor of the computer, to perform:

using, by the validating parser, a first schema definition to validate syntax elements when parsing syntax of an input document, wherein the first schema definition is identified in the input document; and omitting, by the validating parser when generating output from the parsed syntax of the input document, each of at least one of the validated syntax elements which is valid according to the first schema definition but is not valid according to a second schema definition for which the output is generated, wherein:

the first schema definition is an extended schema;

the second schema definition is a base schema from which the extended schema is extended, such that the extended schema defines at least one syntax element that is not defined in the base schema; and the second schema definition is dynamically requested, to the validating parser, by an application program for which the output is being generated.

16. The system according to claim 15, wherein:

an intermediate schema definition extends the base schema by adding at least one syntax element not defined in the base schema; and the first schema definition extends the intermediate schema definition by adding at least one syntax element not defined in the intermediate schema definition; and the omitting also omits each validated syntax element that is valid according to the intermediate schema but which is not valid according to the base schema.

17. A computer program product for applying abstraction with a validating parser, the computer program product embodied on at least one computer-readable medium and comprising computer-readable program code for:

using, by a validating parser, a first schema definition for validating syntax elements when parsing syntax of an input document, wherein the first schema definition is identified in the input document; and omitting, by the validating parser when generating output from the parsed syntax of the input document, each of at least one of the validated syntax elements which is valid according to the first schema definition but is not valid according to a second schema definition for which the output is generated, wherein:

the first schema definition is an extended schema;

the second schema definition is a base schema from which the extended schema is extended, such that the extended schema defines at least one syntax element that is not defined in the base schema; and the second schema definition is dynamically requested, to the validating parser, by an application program for which the output is being generated.

18. The computer program product according to claim 17, wherein:

an intermediate schema definition extends the base schema by adding at least one syntax element not defined in the base schema; and the first schema definition extends the intermediate schema definition by adding at least one syntax element not defined in the intermediate schema definition; and the omitting also omits each validated syntax element that is valid according to the intermediate schema but which is not valid according to the base schema.

\* \* \* \* \*